United States Patent
Gong

(10) Patent No.: US 9,408,166 B2
(45) Date of Patent: Aug. 2, 2016

(54) MITIGATING OVERLAPPING BASIC SERVICE SET INTERFERENCE IN SMART GRID NETWORKS

(75) Inventor: Michelle X. Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,082

(22) PCT Filed: Sep. 30, 2011

(86) PCT No.: PCT/US2011/054435
§ 371 (c)(1),
(2), (4) Date: Mar. 10, 2014

(87) PCT Pub. No.: WO2013/048499
PCT Pub. Date: Apr. 4, 2013

(65) Prior Publication Data
US 2014/0192785 A1 Jul. 10, 2014

(51) Int. Cl.
*H04W 56/00* (2009.01)
*H04W 92/20* (2009.01)

(52) U.S. Cl.
CPC ........... *H04W 56/001* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 7,564,826 B2 * | 7/2009 | Sherman et al. | 370/338 |
| 2004/0253996 A1 * | 12/2004 | Chen et al. | 455/574 |
| 2004/0259542 A1 * | 12/2004 | Viitamaki et al. | 455/426.2 |
| 2005/0068928 A1 * | 3/2005 | Smith et al. | 370/338 |
| 2005/0226207 A1 * | 10/2005 | Sharma | H04W 56/001 370/350 |
| 2007/0014269 A1 | 1/2007 | Sherman et al. | |
| 2007/0268856 A1 * | 11/2007 | Wijting et al. | 370/328 |
| 2008/0013479 A1 * | 1/2008 | Li et al. | 370/328 |
| 2009/0147768 A1 * | 6/2009 | Ji et al. | 370/350 |
| 2009/0279427 A1 | 11/2009 | Ji et al. | |
| 2009/0279487 A1 | 11/2009 | Reumerman et al. | |
| 2010/0165963 A1 | 7/2010 | Chu et al. | |
| 2011/0141966 A1 * | 6/2011 | Kasslin et al. | 370/328 |
| 2011/0199966 A1 | 8/2011 | Cordeiro et al. | |
| 2013/0034004 A1 * | 2/2013 | Mannemala et al. | 370/252 |

FOREIGN PATENT DOCUMENTS

| | | |
|---|---|---|
| CN | 102196470 A | 9/2011 |
| WO | 2011/029821 A1 | 3/2011 |
| WO | 2013/048499 A1 | 4/2013 |

OTHER PUBLICATIONS

Tandai, et al., "Interferential Packet Detection Scheme for a Solution to Overlapping BSS Issues in IEEE 802.11 WLANs", Sep. 11-14, 2006, pp. 1-5.

(Continued)

*Primary Examiner* — Ian N Moore
*Assistant Examiner* — Latresa McCallum
(74) *Attorney, Agent, or Firm* — Forefront IP Lawgroup, PLLC

(57) ABSTRACT

Systems and methods for implementing a mitigation of overlapping basic service set (OBSS) interference are disclosed. Synchronization of access point (AP) devices may be based upon a transmission synchronization function (TSF) offset between the AP devices. In an implementation, collaboration between the AP devices may include exchanging of beacon schedule frames through a controller, or over the air media access.

17 Claims, 5 Drawing Sheets

(56) References Cited

OTHER PUBLICATIONS

Yusuke, et al., "Interference Management Using Beamforming Technique in OBSS Environment", IEEE 802.11-10/0585r0, May 2010, pp. 1-13.

International Search Report and Written Opinion received for PCT Patent Application No. PCT/US2011/054435, mailed on Apr. 24, 2012, 9 pages.

International Preliminary Report on Patentability and Written Opinion received for PCT Patent Application No. PCT/US2011/054435, mailed on Apr. 10, 2014, 6 pages.

Extended European Search Report received for European Patent Application No. 11873125.6, mailed on Apr. 17, 2015, 9 pages.

Office Action and Search Report received for Chinese Patent Application No. 201180073772.2, mailed on Mar. 1, 2016, 2 Pages of English Translation of Search Report and 12 Pages of Chinese Office Action.

* cited by examiner

MITIGATING OVERLAPPING BASIC SERVICE SET INTERFERENCE IN SMART GRID NETWORKS

BACKGROUND

Before wireless communication networks, setting up a computer network in a business or residential area often required running cables through walls and ceilings in order to deliver network access to all of network-enabled devices. With the creation of a wireless Access Point (AP), network users may be able to add the network-enabled stations (STAs) or devices that access a network with few or no cables. The AP may support one or more standards or specifications for sending or receiving data using radio frequencies. The Institute of Electrical and Electronics Engineers or IEEE provides standards, such IEEE 802.11, that defines frequencies of the AP.

Despite recent technologies to improve performance of wireless communications networks, to be on par with wired communications networks, interference may still be a problem affecting system throughput. For example, access points (APs), together with associated STAs (e.g., laptap computers, tablet computers, smart phones, etc.) may reside in multiple Basic Service Sets (BSS). The BSS is a basic building block of 802.11 Wireless Land Area Network (WLAN). Overlapping Basic Service Set (OBSS) interference may be present. The OBSS interference may be caused by a number of contending STAs trying to access the same channel in the multiple BSS. The OBSS interference may cause severe congestion and instability in a wireless communications network. IEEE 802.11aa proposes a mechanism for the APs to coordinate transmission opportunity (TXOP) assignment per traffic specification (TSPEC) for each quality of service (QOS) STA in order to support video QOS; however, the proposed mechanism fails to address the OBSS interference.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
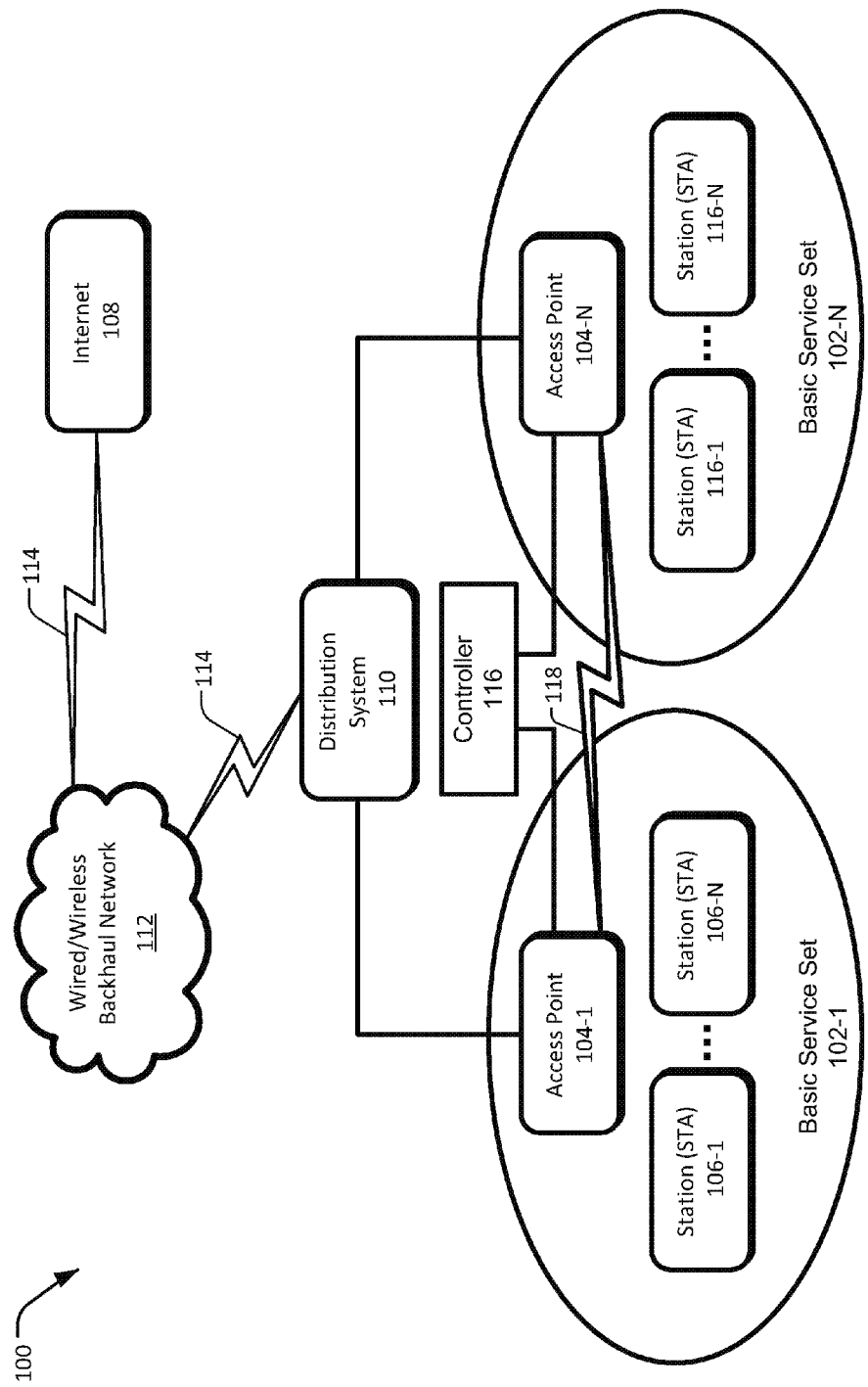
FIG. 1 is a block diagram illustrating an example system implementing an environment for mitigating Overlapping Basic Service Set (OBSS) interference.

One or more access points (APs) are synchronized to mitigate Overlapping Basic Service Set (OBSS) interference. In particular, a stored timing synchronization function (TSF) offset between the APs may indicate a target beacon transmission time (TBTT) in each of the APs. The TBTT in each of the APs may be used to implement a synchronization scheme between the APs. For example, the TBTT of a first AP identifies to a second AP the time of transmission used by the first AP. In this example, the first AP and the second AP may be synchronized without using an external clock or controller. In another implementation, the APs may collaborate with each other on a beacon interval allocation. The allocation of different beacon intervals between the collaborating APs may mitigate the OBSS interference. The collaboration between the APs may include exchange of beacon schedule information communicated to the APs using a controller, or over the air 802.11 medium access method.

Overview

Described herein are architectures, platforms and methods that mitigate OBSS interference in a wireless communications network. The OBSS interference may be mitigated by implementing a synchronization scheme in the APs. The synchronization scheme includes identifying the TBTT for each AP to synchronize the APs without requiring an external clock or controller. The synchronization scheme includes allocation of different beacon intervals after collaboration between the APs. The different beacon intervals chosen by the collaborating APs may mitigate the OBSS interference.

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The term access point (AP) as used herein, is defined as an entity that has STA functionality and provides access to the distribution services, via the wireless medium (WM) for associated STAs. The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session. The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, stations capable of operating as a multi-band stations, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-19992007: Wireless LAN Medium Access Control (MAC) and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, a Wireless Application Protocol (WAP) device, or the like.

Some embodiments may be used in conjunction with suitable limited-range or short-range wireless communication networks, for example, "piconets", e.g., a wireless area network, a WVAN, a WPAN, and the like.

Example System

FIG. 1 illustrates an example system 100 that employs WLAN STAs in one or more BSS.

In an implementation, a BSS 102-1 includes an access point (AP) 104-1 that serves or controls STA 106-1 to STA 106-N (where N is an integer). The BSS 102-1 may include a large coverage area such as a cellular network, or a small coverage area such as a commercial building or a house. The STAs 106 may include a laptop, personal digital assistants (PDA), a mobile device, and the like. Furthermore, the STAs 106-1 may be understood to include other devices.

The APs 104-1 to 104-N may include devices that allow wireless STAs (e.g., STA 106-1) to communicate with other links such as Internet 108. The AP 104-1 can be connected to another AP (e.g., AP 104-2 to 104-N) through a distribution system (DS) 110. The DS 110 may include a system enabling wireless interconnection of the APs 104-1 to 104-N in an IEEE 802.11 network. In another implementation, the DS 110 may allow the WLAN to be expanded using multiple APs (e.g., APs 104-1 to 104-N) without the traditional requirement for a wired backbone to link the APs 104-1 to 104-N. In certain implementations, the DS 110 may connect the APs 104-1 to 104-N to a wired or wireless backhaul network 112. The wired or wireless backhaul network 112 may serve as intermediate links between the BSS 102-1 to 102-N to other servers or links (e.g., Internet 108) using a wireless connection 114. Traffic or traffic streams are sent through the wireless connection 114. In addition, the wireless connection 114 may be a directed or beam formed link between the DS 110 and the wired or wireless backhaul network 112. In another implementation, the AP 104-N may serve STA 116-1 to 116-N in the BSS 102-N. The BSS 102-N may function or operate in the same manner as the BSS 102-1 as discussed above.

In an implementation, the APs 104-1 to 104-N may be configured to include a synchronized scheme without requiring an external clock or a controller. The synchronization scheme of the APs 104-1 to 104-N may be based upon timing synchronization function (TSF) offset stored in the APs 104-1 to 104-N. The stored TSF offset may include a timing offset between TSF of the AP (e.g., AP 104-1) and the TSF of the other APs (e.g., AP 104-2 to AP 104-N). The stored TSF offset may identify to the AP (e.g., AP 104-1) the TWIT of each of the other APs (e.g., AP 104-2 to AP 104-N). In other words, the AP (e.g., AP 104-1) includes information as to when the other APs (e.g., AP 104-2 to AP 104-N) are transmitting or not. Accordingly, the identification of the IBTI' in each of the APs 104-1 to 104-N may be the basis for the synchronization scheme that requires no external clock or controller for implementation.

In an implementation, the APs 104-1 to 104-N collaborate with each other to allocate different beacon interval allocations to be used in the transmission and reception of data. The beacon interval allocation may include a period between two successive transmission of a beacon signal. The collaboration by the APs 104-1 to 104-N may include exchange of a beacon schedule frame. The beacon schedule may include the beacon interval information currently used by the collaborating APs (e.g., AP 104-1 to AP 104-N). Accordingly, the collaborating APs (e.g., AP 104-1 to AP 104-N) may choose non-overlapping beacon intervals in order to mitigate OBSS interference in the BSS 102 (e.g., BSS 102-1 to 102-N).

In an implementation, the beacon schedule frame may be exchanged by the collaboration APs (e.g., AP 104-1 to AP 104-N) through a controller 116, or through a wireless connection 118. The controller 116 may include a layer 3 router device that connects and controls the collaboration between the APs (e.g., AP 104-1 to AP 104-N). The wireless connection 118 may include the standard 802.11 medium access method. In another implementation, the controller 116 can assign different beacon interval allocations to the connected APs directly. The allocated different beacon intervals in the APs (e.g., AP 104-1 to AP 104-N) may mitigate the OBSS interference and avoid congestion such that the wireless communications network can scale to a large number of nodes (e.g., expanded APs). The collaboration of the APs (e.g., AP 104-1 to AP 104-N) to allocate different beacon intervals may work for both enhanced distributed channel access (EDCA) and hybrid coordination function controlled channel access (HCFA).

Example Access Point

Figure 2:
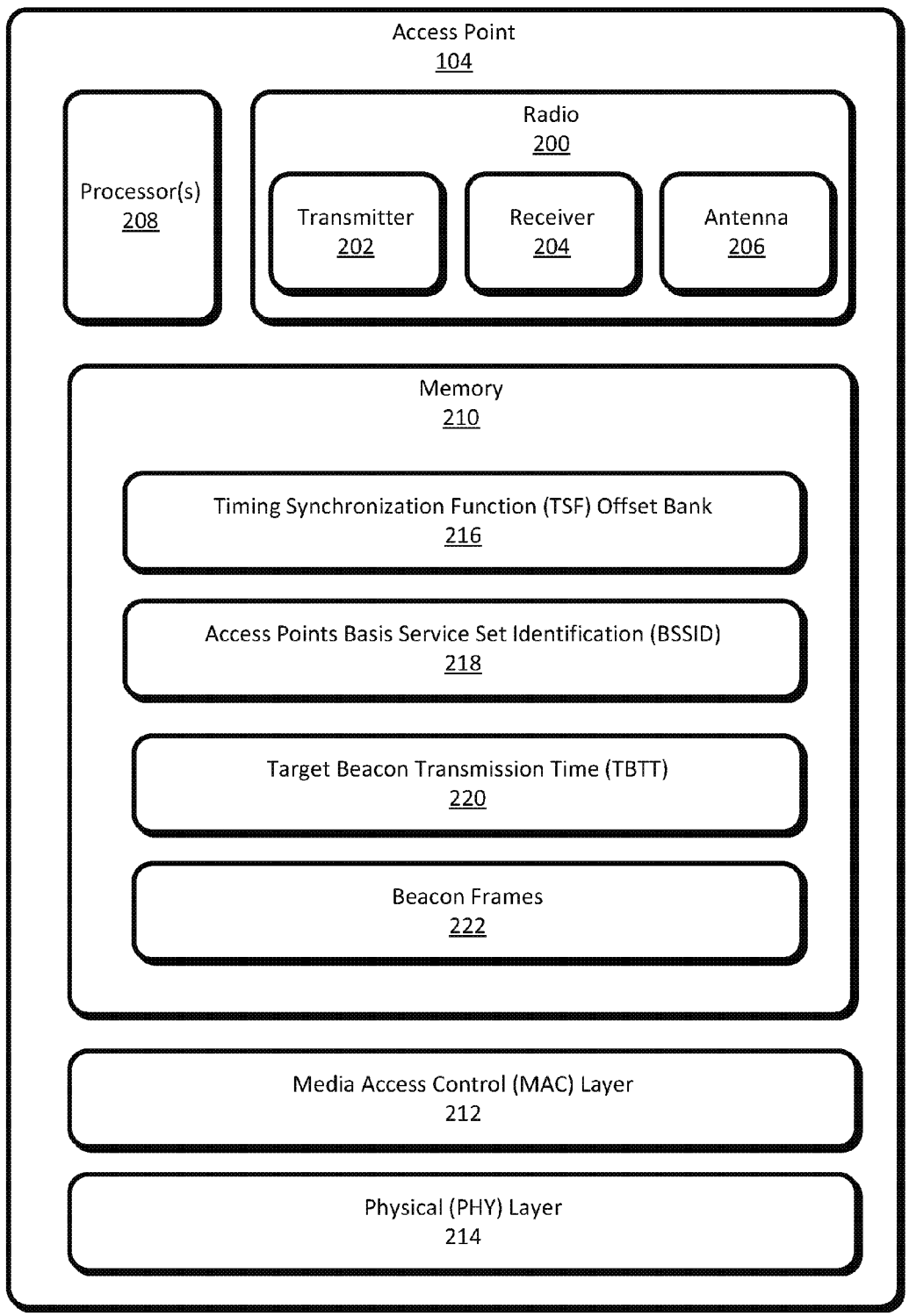
FIG. 2 is a block diagram illustrating an example access point (AP) device that implements a synchronization scheme, and a mechanism for collaboration with other AP device to mitigate Overlapping Basic Service Set (OBSS) interference.

FIG. 2 is an example implementation of the AP 104. The AP 104 may include a radio 200 that includes a transmitter 202, a receiver 204 and one or more antenna 206. In certain implementations, the radio 200 is based on the IEEE 802.11ah standard, operating in the sub 1 GHz range.

The AP 104 includes one or more processor(s) 208. Processor(s) 208 may be a single processing unit or a number of processing units, all of which may include single or multiple computing units or multiple cores. The processor(s) 208 may be implemented as one or more microprocessors, microcomputers, microcontrollers, digital signal processors, central processing units, state machines, logic circuitries, and/or any devices that manipulate signals based on operational instructions. Among other capabilities, the processor(s) 208 may be configured to fetch and execute computer-readable instructions or processor-accessible instructions stored in a memory 210 or other computer-readable storage media.

The AP 104 may be configured to employ a synchronized scheme with other APs (e.g., if AP 104 is AP-104-1, the other APs may be APs 104-2 to 104-N). The synchronized scheme may avoid requirements of an external clock or controller to synchronize the APs (e.g., APs 104-1 to 104-N). For example, the AP (104-1) may identify the TBTT of the other APs (APs 104-2 to 104-N). In this example, the AP (e.g., AP 104-1) recognizes the time of data transmission used by the other APs (APs 104-2 to 104-N). The knowledge or identification of the TBTT of the other APs (e.g, APs 104-2 to 104-N) may provide basis for the synchronization scheme in the APs (e.g., AP 104-1 to AP 104-N) that requires no external clock or controller during implementation. In an implementation, the AP 104 may collaborate with other APs regarding different interval allocations. For example, the transmitter 202 transmits the beacon frame generated in the processor(s) 208.

The processor(s) 208 may further access a Media Access Control (MAC) layer 212 that inserts a value of the beacon interval to a field in the beacon frame. The beacon frame may include beacon schedule frames as further discussed in FIGS. 4a, 4b, and 4c below. In another implementation, the processor(s) 208 further accesses a physical or PHY layer 214 that may transform the beacon frame into wireless signals.

In an implementation, the processor(s) 208 may implement the synchronization of the AP 104 based on a beacon timing synchronization function (TSF) offset stored in the memory 210.

The memory 210 may further include a TSF offset bank 216 that stores the respective TSF offset between the AP 104-1 and each of the other APs (e.g., APs 104-2 to 104-N). The memory 210 may further include an access point BSS Identification (BSSID) 218 that identifies the AP (e.g., AP 104-1). For example, the BSSID 218 may be a 48-bit identifier that uniquely identifies the AP (e.g., AP 104-1). The AP (e.g., AP 104-1) identification may be obtained by the STAs 106-1 to 106-N that are associated with the AP (e.g., AP 104-1) in the BSS (e.g., BSS 102-1). In another implementation, the BSSID 218 may include the BSSIDs of the other APs (e.g., APs 104-2 to 104-N) to identify respective TSF offset entries of the other APs (e.g., APs 104-2 to 104-N) at the TSF offset bank 216. The respective TSF offset between the APs (e.g., APs 104-1 to 104-N) may be used to identify the respective TBTT of the other APs (e.g., APs 104-2 to 104-N). The TBTT of the other APs (e.g., APs 104-2 to 104-N) may be used as basis for the synchronization scheme without requiring external clock or controller in the APs (e.g., APs 104-1 to 104-N). The TBTT of the APs (e.g., APs 104-1 to 104-N) may be stored at TBTT 220.

Further, the AP 104-1 may collaborate with other APs (e.g., APs 104-2 to 104-N) to allocate different beacon intervals. For instance, the AP (e.g., AP 104-1) may choose beacon interval 1, 5, 9, etc., while the other collaborating APs (e.g., AP 104-2) may choose beacon interval 2, 6, 10, etc. Because different BSS (e.g., BSS 102-1 to 102-N) may choose non-overlapping beacon intervals, the OBSS interference may be mitigated. In an implementation, the AP (e.g., AP 104-1) "advertises" through the beacon frame the beacon intervals that the AP (e.g., AP 104-1) has chosen to operate the BSS (e.g., BSS 102-1) to which the AP (e.g., AP 104-1) is associated. The beacon interval currently used by the AP 104-1 may be generated in the processor(s) 208. The processor(s) 208 may further access MAC layer 212 which inserts a value of the beacon interval to a field in the beacon frame. The beacon frame may further include other parameters such as the beacon schedule field that are stored in beacon frames 222. The beacon frames 222 may store the beacon intervals currently used by the collaborating AP (e.g., AP 104-2). The collaboration from the APs (e.g., APs 104-2 to 104-N) may be received by the AP 104-1 using the receiver 204.

In certain implementations, the memory component 210 is an example of computer-readable storage media for storing instructions which are executed by the processor(s) 208 to perform the various functions described above. For example, memory 210 may generally include both volatile memory and non-volatile memory (e.g., RAM, ROM, or the like). Memory 210 may be referred to as memory or computer-readable storage media herein. Memory 210 is capable of storing computer-readable, processor-executable program instructions as computer program code that may be executed by the processor(s) 210 as a particular machine configured for carrying out the operations and functions described in the implementations herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example Station

Figure 3:
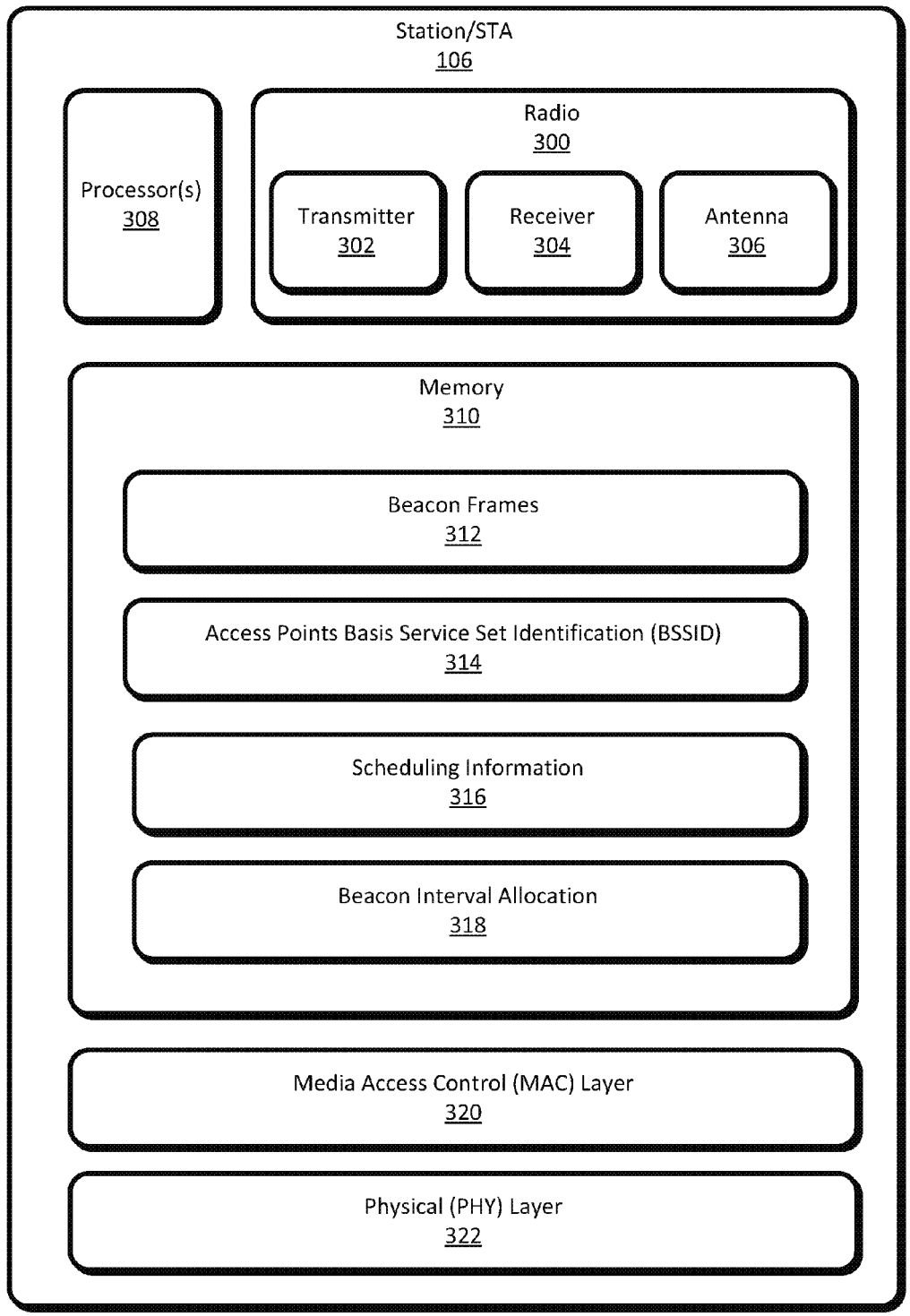
FIG. 3 is a block diagram illustrating an example station device that adopts beacon interval allocations in the AP device.

FIG. 3 is an example implementation of a station or STA 106. The STA 106 may include a radio 300 that includes a transmitter 302, a receiver 304 and one or more antenna 306. In certain implementations, the radio 300 is based on the IEEE 802.11ah standard, operating in the sub 1 GHz range.

STA 106 includes one or more processor(s) 308. Processor(s) 308 may be a single processing unit or a number of processing units, all of which may include single or multiple computing units or multiple cores. The processor(s) 308 may be implemented as one or more microprocessors, microcomputers, microcontrollers, digital signal processors, central processing units, state machines, logic circuitries, and/or any devices that manipulate signals based on operational instructions. Among other capabilities, the processor(s) 308 may be configured to fetch and execute computer-readable instructions or processor-accessible instructions stored in a memory 310 or other computer-readable storage media.

In an implementation, the STA 106 may adopt the beacon interval allocations configured on the APs 104-1 to 104-N. In particular, the STA 106 may adopt the configuration and status of the AP (e.g., AP 104-1) to which the STA (e.g., STA 106-1) is associated with in the BSS (e.g., BSS 102-1). The STA (e.g., STA 104-1) may include periodically receiving a beacon frame from the AP 104-1 using the receiver 304. The beacon frame may include the beacon interval allocated to the AP 104-1. The STA (e.g., STA 106-1) analyzes the received beacon frame and stores the beacon schedule information in beacon frames 312 of the memory 310. The beacon frames may further include the BSSID of the transmitting AP (e.g., AP 104-1). The BSSID may be stored in BSSID 314 of the memory 310. The received beacon frame may include scheduling information of the transmitting AP (e.g., AP 104-1) to which the STA (e.g., STA 106-1) is associated with. The scheduling information may be stored in scheduling information 316 of the memory 310. The beacon interval allocation of the AP 104-1 may be stored at the beacon interval allocation 318.

The STA (e.g., STA 106-1) may communicate with the AP (e.g., AP 104-1) when the STA 106-1 joins the BSS (e.g., BSS 102-1). The communication by the STA 106-1 may be initiated at the processor(s) 308. For example, the processor(s) 308 may access a media access control or MAC layer 320 to generate a first frame that contains a request by the STA (e.g., STA 106-1) to join the BSS 102-1. The first frame may be transformed into wireless signals by a physical layer or PHY 322 prior to transmission at the transmitter 302.

In certain implementations, the memory component 310 is an example of computer-readable storage media for storing instructions which are executed by the processor(s) 308 to perform the various functions described above. For example, memory 310 may generally include both volatile memory and non-volatile memory (e.g., RAM, ROM, or the like). Memory 310 may be referred to as memory or computer-readable storage media herein. Memory 310 is capable of storing computer-readable, processor-executable program instructions as computer program code that may be executed by the processor(s) 308 as a particular machine configured for carrying out the operations and functions described in the implementations herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Figure 4A:
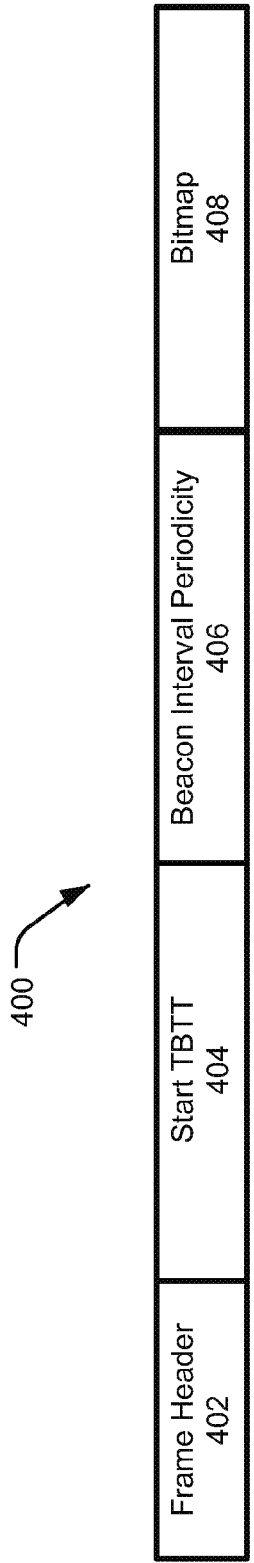
FIGS. 4a, 4b, and 4c are block diagrams illustrating example beacon frames transmitted by a collaborating AP device for mitigating Overlapping Basic Service Set (OBSS) interference.

FIG. 4a is an example implementation of a frame format in the beacon schedule transmitted by the AP (e.g., AP 104-1) to a collaborating AP (e.g., AP 104-2). In an implementation, the beacon frame includes a frame header 402, a start TBTT 404, a beacon interval periodicity 406, and a bitmap 408. The frame header 402 in the beacon frame may include a media access control address (MAC address) to identify source (e.g., AP 104-1) and destination (e.g., AP 104-2) of the beacon frame. The start TBTT 404 field may identify starting points of a super beacon interval. The super beacon interval is a type of beacon interval that includes more than one beacon interval employed in the AP 104-1. The beacon interval periodicity 406 may define how many beacon intervals are included in the super beacon interval. The bitmap 408 field may identify which beacon interval within the super beacon interval is employed or being used by the AP 104-1. For example, if a bit is set to one, the AP 104-1 may currently use the corresponding beacon interval. To illustrate, if the beacon interval periodicity 406 is "16" and bitmap 408 shows "0011110000000000," then the beacon intervals 3, 4, 5, 6 out of 16 beacon intervals are being used by the AP 104-1.

Figure 4B:

FIG. 4b is an example implementation of another beacon frame format in the beacon schedule frame. The beacon frame format employs a duration 410 field in addition to the frame header 402, start TBTT 404, and the beacon interval periodicity 406 used in FIG. 4A. In an implementation, the duration 410 may identify a contiguous period of time of the beacon interval that the current AP (e.g., AP 104-1) is using. In another implementation, the Beacon Interval Periodicity 406 may indicate the number of beacon intervals—between two successive beacon intervals—that are being used by the AP 104-1.

Figure 4C:

FIG. 4c is an example implementation of another beacon frame format as an alternative for the beacon schedule frame in FIGS. 4A and 4B. In an implementation, the beacon frame format may include a Beacon Schedule Information Element (IE) that identifies the beacon intervals that are being used by the AP 104-1. The beacon frame format may include a length 412 to replace the start TBTT 404. In an implementation, the start TBTT 404 may be set to zero to reduce overhead in the beacon frame. The length 412 may identify a period for the beacon interval used by the AP 104-1.

Example Method

Figure 5:
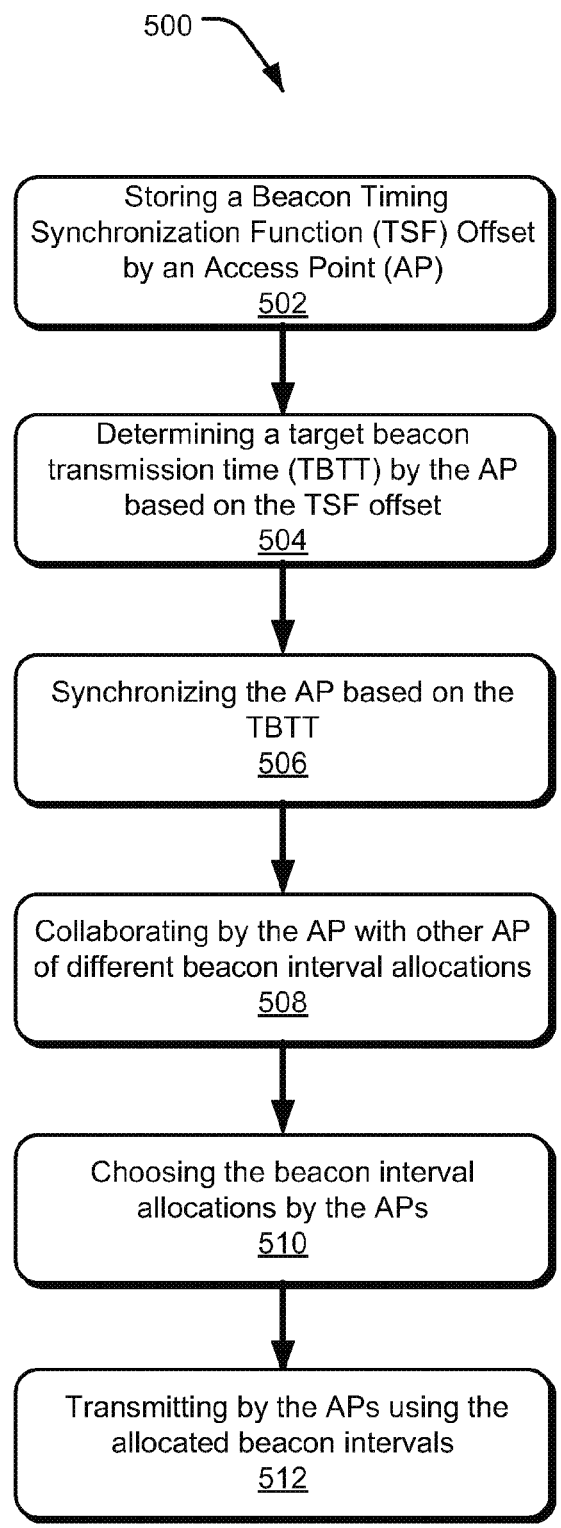
FIG. 5 is a flow chart illustrating an example method for mitigating Overlapping Basic Service Set (OBSS) interference.

FIG. 5 illustrates an example method 500 for implementing mitigation of the OBSS interference. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, storing a beacon TSF offset by an AP is performed. In an implementation, a TSF Offset Bank component (e.g., TSF Offset Bank 216) may store the respective TSF offset between the APs 104-1 to 104-N. For example, a timing offset between the TSF of the AP (e.g., AP 104-1) and the TSF of the other APs (e.g., AP 104-2 to AP 104-N) may be stored in the TSF Offset Bank 216 of the AP (e.g., AP 104-1).

At block 504, determining a TBTT based on the TSF offset is performed. In an implementation, the AP (e.g., AP 104-1) determines the respective IBTIs of the other APs (e.g., AP 104-2 to AP 104-N) based on the TSF offset.

At block 506, synchronizing the AP based on the TBTT is performed. In an implementation, the AP 104 (e.g., AP 104-1 to AP 104-N) may be synchronized based on the TBTT without requiring an external clock or a controller.

At block 508, collaborating by the AP is performed. In an implementation, the APs 104-1 to 104-N may collaborate or communicate with each other regarding different beacon interval allocations. The collaboration between the APs 104-1 to 104-N may include exchanging of beacon schedule frames using a controller device (e.g., controller 116), or wireless connection (e.g., IEEE 802.11 medium access method). In another implementation, the collaborating AP (e.g., AP 104-1) may advertise the beacon intervals that the AP 104-1 has chosen to use in the BSS (e.g., BSS 102-1).

At block 510, choosing the beacon interval allocation by the collaborating AP is performed. In an implementation, the collaborating AP (e.g., AP 104-1) may choose the beacon intervals that may not overlap with the beacon intervals chosen by the other collaborating AP (e.g., AP 104-2). For example, the collaborating AP (e.g., AP 104-1) may choose 1, 2, and 3 beacon intervals, while the other collaborating AT (e.g., AP 104-2) may choose 4, 5, and 6 beacon intervals. The non-overlapping beacon intervals in the collaborating APs (e.g., AP 104-1 and AP 104-2) may mitigate the OBSS interference.

At block 512, transmitting by the AP on the allocated beacon intervals is performed. In an implementation, a transmitter (e.g., transmitter 202) of the AP 104-1 may transmit information using the allocated beacon interval chosen by the AP 104-1.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method for mitigating Overlapping Basic Service Set (OBSS) interference in a wireless communications network, the method comprising:

receiving a pre-configured timing synchronization function (TSF) offset by a first device;

storing the timing synchronization function (TSF) offset to a TSF offset bank component of the first access point (AP) device, wherein the TSF offset includes a timing offset between the first AP device and a plurality of other access point (AP) devices;

determining a target beacon transmission time (TBTT) of the first AP devices based upon the stored TSF offset, wherein the TBTT includes a starting point of a super beacon interval;

generating and allocating of at least one beacon interval from the super beacon interval by a processor, wherein the generated and allocated at least one beacon interval is used by the first AP for the wireless communications network; and collaborating and transmitting to the plurality of other AP devices a beacon frame that represents the generated at least one beacon interval, wherein the beacon frame includes the determined TBTT, a total number of beacon intervals in the super beacon interval, and an identification of the at least one beacon interval that is used by the first AP device, a media access address to identify the first access point as the transmitter, and a target beacon transmission time (TBTT) that is set to zero to reduce overhead in the beacon frame.

2. The method of claim 1, wherein determined TBTT is utilized as a reference time for the generated and allocated at least one beacon interval.

3. The method of claim 1, wherein the TSF offset is utilized to determine TBTT of the plurality of other AP devices.

4. The method of claim 1, wherein the total number of beacon intervals in the super beacon intervals are shared by the first AP and the plurality of other AP devices.

5. The method of claim 1, wherein the beacon interval generated by the first AP device is configured not to overlap with other beacon intervals used by the plurality of other AP devices.

6. A wireless communications network comprising:

a first access point device configured to be synchronized with other access point devices, wherein the access point device further comprises:

a timing synchronization function (TSF) offset bank component that stores a timing offset between the first access point device and other access point (AP) devices;

a processor configured to generate and allocate to the first access point device at least one beacon interval;

a transmitter that facilitates collaboration and transmission of a beacon frame with the other (AP) devices, wherein the beacon frame includes a duration of the allocated at least one beacon interval, a total number of beacon intervals in a super beacon interval, an identification of the at least one beacon interval that is allocated to the first AP device, a media access address to identify the first access point as the transmitter, and a target beacon transmission time (TBTT) that is set to zero to reduce overhead in the beacon frame; and a station, associated with the access point device, wherein the station adopts the beacon interval allocation generated and allocated by the first access point device.

7. The wireless communications network of claim 6, wherein a target beacon transmission time (TBTT) of the first access point device is based from the timing offset.

8. The wireless communications network of claim 7, wherein the TBTT is utilized as a reference for the generated at least one beacon interval.

9. The wireless communications network of claim 6, wherein the duration indicates a contiguous period of time of the at least one beacon interval in the first access point device.

10. The wireless communications network of claim 6, wherein the number of beacon intervals contained in super beacon interval are shared by the first access point device and other access point devices.

11. The wireless communications network of claim 6, wherein the TSF offset is used to determine a target beacon transmission time (TBTT) of the first access point device and the other access point devices.

12. An access point (AP) device comprising:

a timing synchronization function (TSF) offset bank component that stores a timing offset between the access point device and other access point devices;

one or more processors configured to generate and allocate at least one beacon interval for use by the AP device; and a transmitter that facilitates collaboration and transmission of a beacon frame-to other AP devices, wherein the beacon frame includes a duration of the allocated at least one beacon interval, a total number of beacon intervals in a super beacon interval, and an identification of the at least one beacon interval that is allocated to the AP device, a media access address to identify the first access point as the transmitter, and a target beacon transmission time (TBTT) that is set to zero to reduce overhead in the beacon frame.

13. The AP device of claim 12, wherein the processor is further configured to derive a target beacon transmission time (TBTT) of the AP device based from the TSF offset.

14. The AP device of claim 13, wherein the TBTT is utilized as a reference for the generated and allocated at least one beacon interval.

15. AP device of claim 12, wherein the number of beacon intervals contained in the super beacon interval are shared by the access point device and the other access point devices.

16. The AP device of claim 12, wherein the allocated at least one beacon interval is configured not overlap with beacon intervals of the other access point devices.

17. The AP device of claim 12, wherein the duration indicates a contiguous period of time of the at least one beacon interval in the first access point device.

\* \* \* \* \*